United States Patent [19]

McCallum

[11] Patent Number: 4,518,057
[45] Date of Patent: May 21, 1985

[54] WHEELCHAIR TRANSPORTING WITH SELECTIVELY RAISABLE PLATFORM MEANS

[76] Inventor: Michael McCallum, 431 W. Oakdale, Chicago, Ill. 60657

[21] Appl. No.: 502,316

[22] Filed: Jun. 8, 1983

[51] Int. Cl.³ .......................................... B62K 15/00
[52] U.S. Cl. ................................. 180/210; 74/792; 180/907; 267/58; 280/43.23; 280/278; 296/65 R; 297/DIG. 4; 410/4; 410/7; 410/9; 414/537; 414/921
[58] Field of Search ............... 180/209, 210, 213, 214, 180/DIG. 3, 11, 13, 74, 223, 253, 336; 280/203, 210, 242 WC, 289 WC, 415 R, 638, 6 H, 43.20, 43.23, 80 R, 479 R, 278, 287; 267/58; 297/DIG. 4; 5/81 R; 74/789, 792; 296/65 R; 410/2, 3, 4, 6, 7, 9; 10, 11; 414/537, 921, 469

[56] References Cited

U.S. PATENT DOCUMENTS

| | | | |
|---|---|---|---|
| 2,227,762 | 1/1941 | Ronning | 267/58 |
| 4,019,752 | 4/1977 | Leon et al. | 410/7 X |
| 4,027,747 | 6/1977 | Moorman, Jr. | 410/7 X |
| 4,103,934 | 8/1978 | Arnholt et al. | 410/7 X |
| 4,415,056 | 11/1983 | Smith | 180/210 |

FOREIGN PATENT DOCUMENTS

| | | | |
|---|---|---|---|
| 2628736 | 1/1977 | Fed. Rep. of Germany | 414/921 |
| 1540324 | 8/1968 | France | 180/13 |
| 2499001 | 8/1982 | France | 414/469 |

Primary Examiner—Richard A. Bertsch
Assistant Examiner—Mitchell J. Hill
Attorney, Agent, or Firm—Charles Hieken

[57] ABSTRACT

A tricycle powered wheelchair carrier has a platform supported on the bight of a U-shaped axle between a pair of rear wheels supported at the ends of the axle legs. The platform is formed with a downwardly sloping ramp portion at the end extending beyond the rear wheels. A front wheel is connected to handlebars at the front of a platform by a linkage pivoted at the top. A front actuator is connected between this linkage and the platform. A rear actuator is connected between the U-shaped axle and the platform. A transmission couples an internal combustion engine to a rear wheel and includes a reverse gear. A locking bar has rear and side mutually perpendicular arms. The side arm is pivotal about a horizontal axis in bearings on the side of the carrier to allow the side arm to move from a vertical position to a horizontal position against the rear wheels of a wheelchair on the platform with the end of the rear arm having a stud seated in a socket attached to the other side of the carrier. Front and side stops are provided to prevent motion of the wheelchair in the forward direction or side to side. These stops contact the front of left and right rear wheelchair tires and the sides of the rear wheelchair tires.

18 Claims, 11 Drawing Figures

WHEELCHAIR TRANSPORTING WITH SELECTIVELY RAISABLE PLATFORM MEANS

The present invention relates in general to wheelchair transporting and more particularly concerns novel apparatus and techniques for allowing a wheelchair occupant to easily board a self-powered carrier, operate the carrier from the wheelchair to reach a desired destination, and easily disembark from the carrier in the wheelchair at the destination. The invention facilitates boarding and departing directly from a sidewalk.

There are a number of wheelchair carriers. A search of the prior art in subclasses 65 R, DIG. 3, 215 and 216 of class 180 and subclass 43.24 of class 280 uncovered U.S. Pat. Nos. 2,710,659, 3,204,791, 3,572,455, 3,912,032, 3,921,740, 3,939,931, 4,221,276 and French Pat. No. 1.540.324.

It is an important object of the invention to provide an improved wheelchair carrier.

According to the invention, there is essentially horizontal platform means for supporting a wheelchair between a pair of rear wheels and extending toward a front steerable wheel. There is means for selectively raising and lowering the platform means between a first loading position just above ground level on which the wheels rest and a second riding position above the ground level on which the wheels rest. Preferably the rear of the platform means is formed with a gradually sloped ramp means for contact with a surface, such as the street or sidewalk, that may support a wheelchair for providing easy access between the platform means and the surface for a wheelchair. Preferably the height of this ramp means with the platform means in the riding position is greater than curb height so that the platform means may be positioned with the rear wheels against a curb and lowered with the ramp means contacting a sidewalk adjacent the curb, thereby providing access anywhere along the length of a city block to the wheelchair occupant, even where the city blocks have no wheelchair ramps.

There is means for locking a wheelchair on said platform support means in riding position with the occupant facing the front wheel and having access to steering and power controls. This locking means may comprise means for engaging lower struts on a wheelchair below the wheelchair seat. Preferably the locking means is easily operated by the wheelchair occupant when in riding position to both lock the chair into and release it from riding position.

One form of locking means comprises a locking bar with rear and side portions mutually perpendicular. the side portion is pivotal about a fore-aft axis along the side of the carrier to allow the rear portion to move between a vertical unlocked position and a horizontal locking position abutting the wheelchair rear wheels. The rear portion carries a pair of cable-operated locks that selectively engage the inside of each rear wheelchair rim to keep the wheelchair stationary on the platform means.

A preferred form of locking means comprises a locking bar which can pivot between a vertical unlocked position and a horizontal locked position. In the horizontal locked position the locking bar is in contact with the rearmost part of the rear wheelchair tires. The locking bar therefore prevents the wheelchair from moving towards the rear of the vehicle when in the locked (horizontal) position. The locking bar is fitted with a handle which allows the rider to raise the bar to a vertical position or lower it to a horizontal position while seated in the wheelchair. The second part of the preferred locking means comprises two front wheelchair stops; one of which engages the front of the left rear tire, the other of which engages the front of the right rear tire. When the wheelchair is positioned on the platform means such that the front of the rear wheelchair wheels are touching the two front wheelchair stops and the rear locking bar is in the horizontal position, the wheelchair is prevented from moving either forwards or rearwards on the platform means. To prevent side to side motion of the wheelchair on the platform means the front wheelchair stops are made with side stops which project out from the front stops towards the rear of the vehicle and engage the sides of the rear wheels. The width of the side stops is adjustable to accommodate different width wheelchairs.

Numerous other features, objects and advantages of the invention will become apparent from the following specification when read in connection with the accompanying drawing in which.

Figure 1:
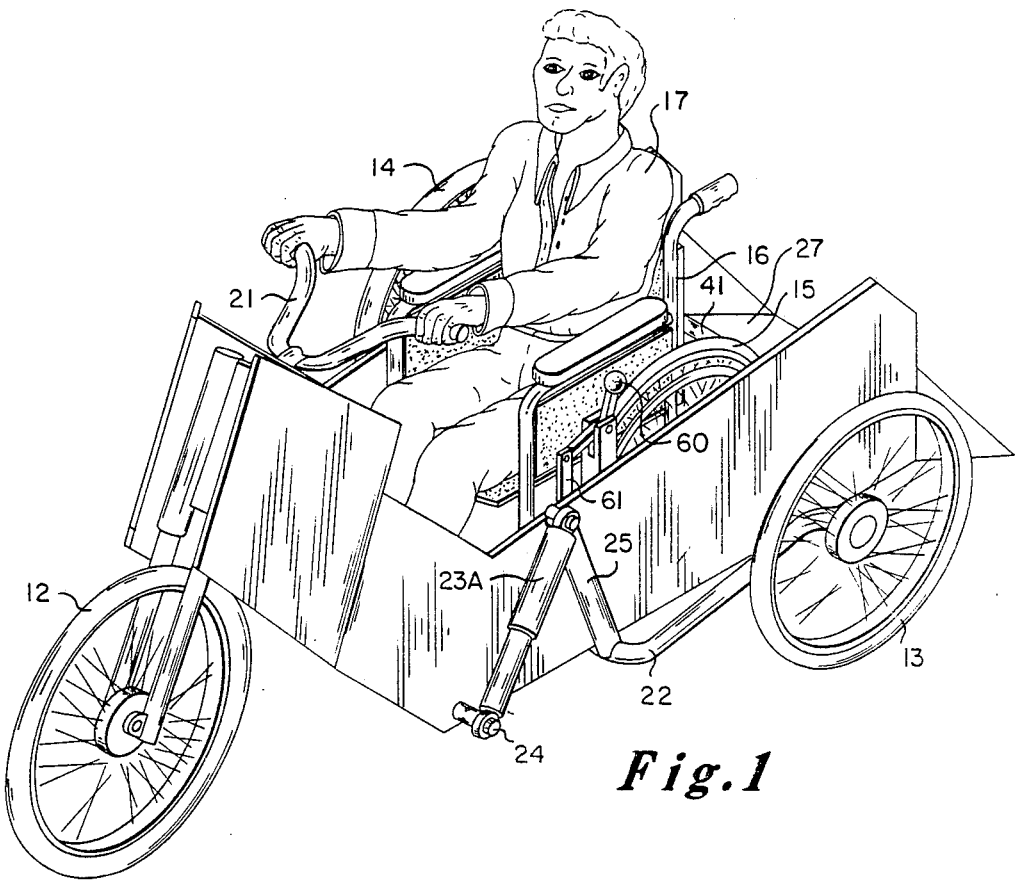
FIG. 1 is a perspective view of an embodiment of the invention showing a wheelchair and its occupant in riding position controlling a motor trike carrier according to the invention.

With reference now to the drawing and more particularly FIG. 1 thereof, there is shown an embodiment of the invention comprising a motor tricycle having a steerable front wheel 12 and left and right rear wheels 13 and 14, respectively. A wheelchair support platform 15 supports wheelchair 16 with its occupant 17 facing steerable front wheel 12 and controlling it with handlebars 21. The occupant also may operate conventional handlebar throttle and brake controls not shown to avoid obscuring the principles of the invention.

The bight of U-shaped axle 22 supports platform 15. The ends of axle 22 support rear wheels 13 and 14. Two rear actuators 23A and 23B, which may be mechanical, pneumatic, hydraulic or electric, are pivotally connected at one end to a front rod 24 and at the other end to a link 25. Link 25 is welded to U-shaped axle 22. Platform 15 is formed with a downwardly extending overhanging rear ramp 27.

U-shaped axle 22 and linkages connected to it, such as link 25 and actuator 23A, comprise frame means surrounding the platform means for interconnecting the rear wheel assembly and front wheel assembly. The pivotal connection at front rod 24 interconnects platform 15 and the frame means for allowing platform 15 to be raised and lowered within the frame means.

Figure 2:
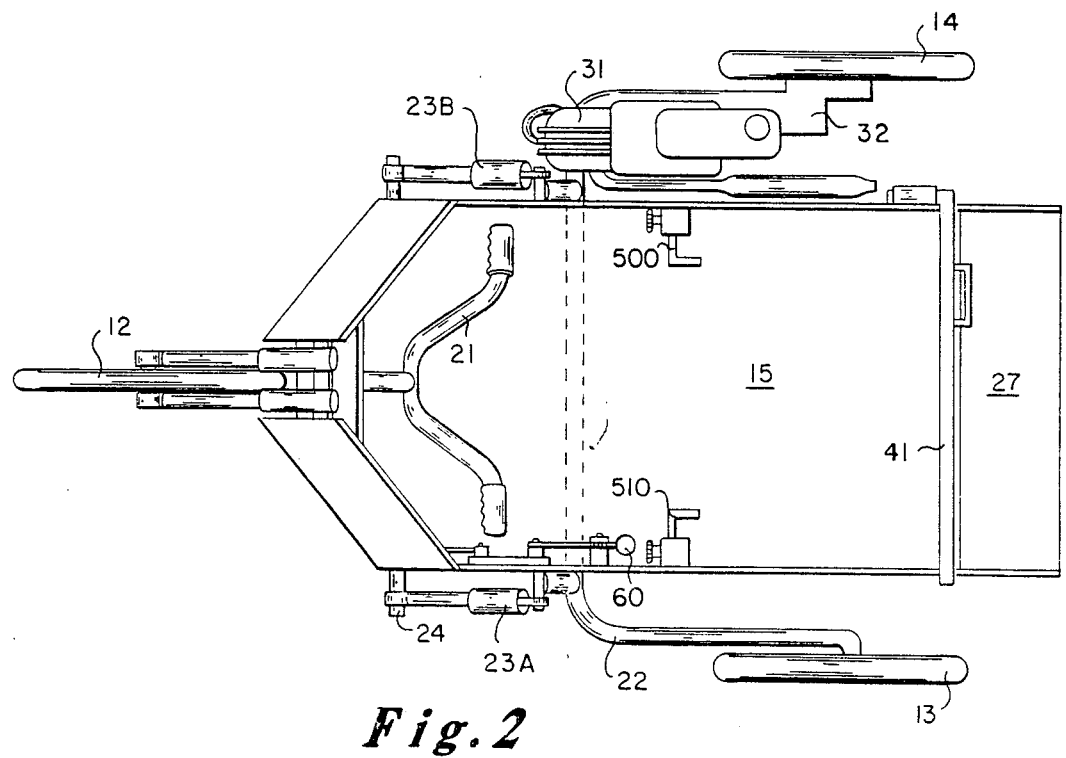
FIG. 2 is a top view of the embodiment of FIG. 1.

Referring to FIG. 2, there is shown a top view of the carrier of FIG. 1 with the wheelchair removed and with details of certain other elements of the system omitted to avoid obscuring the general arrangement of the carrier. The invention uses a conventional moped engine 31 and preferably a special transmission 32 intercoupling the engine to the driven rear wheel 14. A preferred special transmission comprises a standard moped automatic transmission to which has been added a planetary (or other) gear train. This added gear train can be bypassed for normal operation of the vehicle in the forward direction, or it can be engaged by the operator to move the vehicle in the reverse direction. The reverse gear also has an additional gear reduction so that the reverse speed is slower than the forward speed.

A means of power transmission may also be a gas or electric engine driving a hydraulic pump which then transmits power to the hydraulic motors hich drive the wheels. This means of transmission is able to drive one, two, or three wheels with variations in design. Reverse is accomplished by reversing the hydraulic fluid flow with a valve or by reversing the output of the hydraulic pump. A variable displacement pump may be used to provide a wide range of torque and speed.

Figure 3:
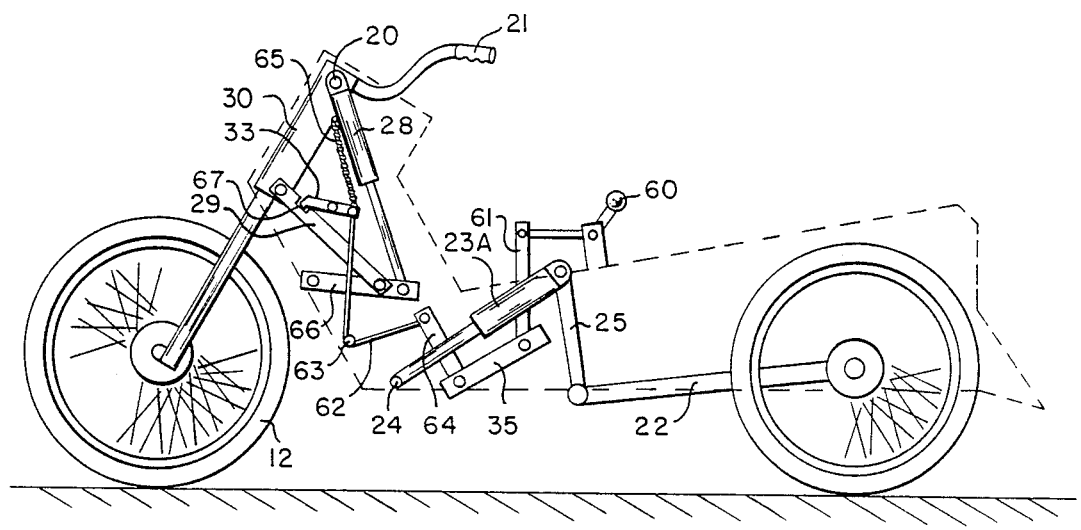
FIGS. 3-5 are side views of the embodiment of FIGS. 1 and 2 showing the invention in riding, ground level wheelchair-transfer and sidewalk level wheelchair transfer positions, respectively.

Referring to FIG. 3, there is shown a side elevation view of the carrier of FIGS. 1 and 2 in the up position for driving. Actuator 28 is pivotally connected to lever 66 which is pivotally connected to link 29 which is pivotally connected to front fork 30. Front lock 33 is held engaged into notch 67 by spring 65. The top of actuator 28 and fork 30 share a common pivot point at the pivot 20 which is fixed to the vehicle body. In the up position for riding, actuator 28 is fully extended, which causes lever 66 to pull link 29 and fork 30 into the up position. When link 29 is in the up position, notch 67 is located so that safety lock 33 engages notch 67 because of the pull of spring 65. Spring 65 also pulls on cable 62, which pulls rear safety stop 35 into the engaged position by pulling on arm 64 welded to safety stop 35. Pulley 63 allows cable 62 to go around a corner. Rod 61 forces control level 60 into the up position. Actuators 23A and 23B are also fully extended forcing link 25A and 25B to push axle 22 which pivots with respect to the vehicle body and causes it to lift.

Figure 4:
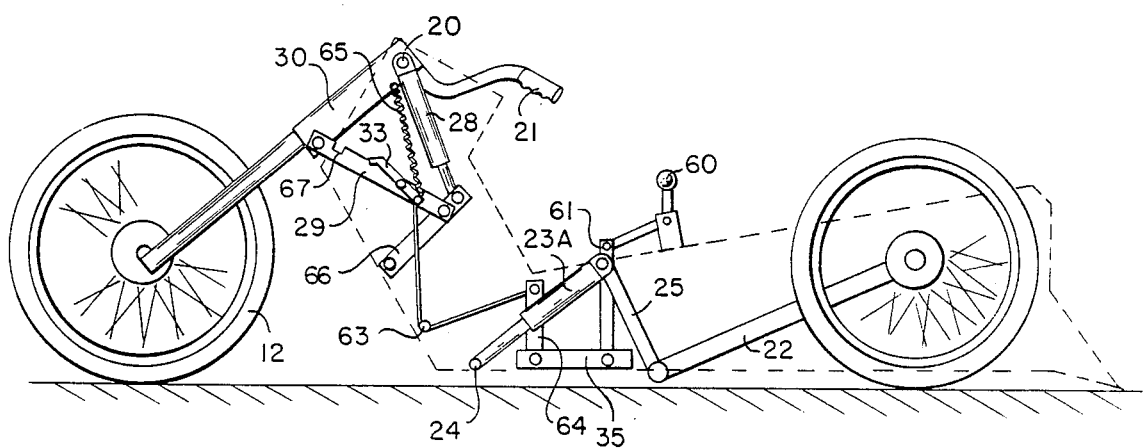

Referring to FIG. 4, there is shown the carrier in the down position with actuator 28 and link 29 fully retracted and front wheel 12 pivoted clockwise about the pivot axis at 20. Actuators 23A and 23B are also fully retracted causing axle 22 to pivot counter clockwise and lower vehicle body. Ramp 27 then contacts the ground, providing easy access for a wheelchair to be wheeled on or off the platform. Prior to retraction of the actuators, front lock mechanism 33 is unlocked, and safety stop 35 is retracted.

To unlock the front lock 33 and retract the rear safety stop 35 the operator moves control lever 60 forward which pushes rod 61 down which forces safety stop 35 to move downward into the retracted position. Simultaneously cable 62 is pulled by arm 64 (which is welded to rear safety stop 35). Cable 62 pulls on front lock 33 which releases it from notch 67. Pulley 63 allows cable 62 to transmit its motion around a corner.

Figure 5:
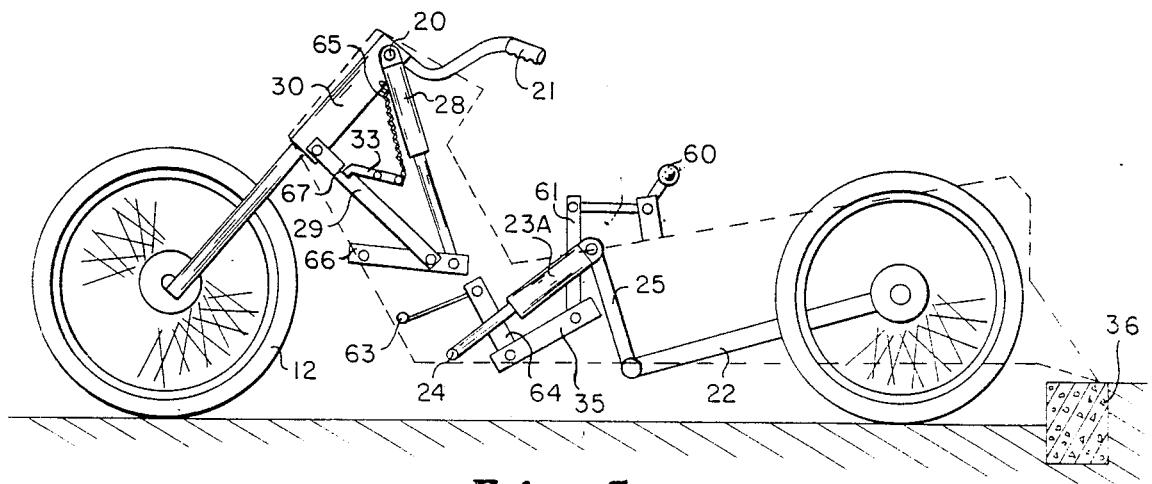

Referring to FIG. 5, there is shown a side view of the invention positioned for providing access to a sidewalk with the end of ramp 27 at sidewalk height. Front lock 33 remains locked. Rear actuators 23A and 23B are retracted slightly until ramp 27 rests on the curb 36, and curb 36 then carries the weight of the vehicle formerly carried by rear wheel 13 and 14. Making ramp 27 stationary in fixed relationship to platform 15 produces this advantageous result of then supporting the rear of the vehicle for easy access to and from the sidewalk while keeping the vehicle stationary. Preferably the overhang of ramp 27 is long enough so that with rear wheels 13 and 14 abutting curb 36, ramp 27 firmly engages curb 36 or the adjacent sidewalk. If the curb is higher than the end of ramp 27, rear actuators 23A and 23B may be extended until the end of ramp 27 clears the curb.

Figure 6:
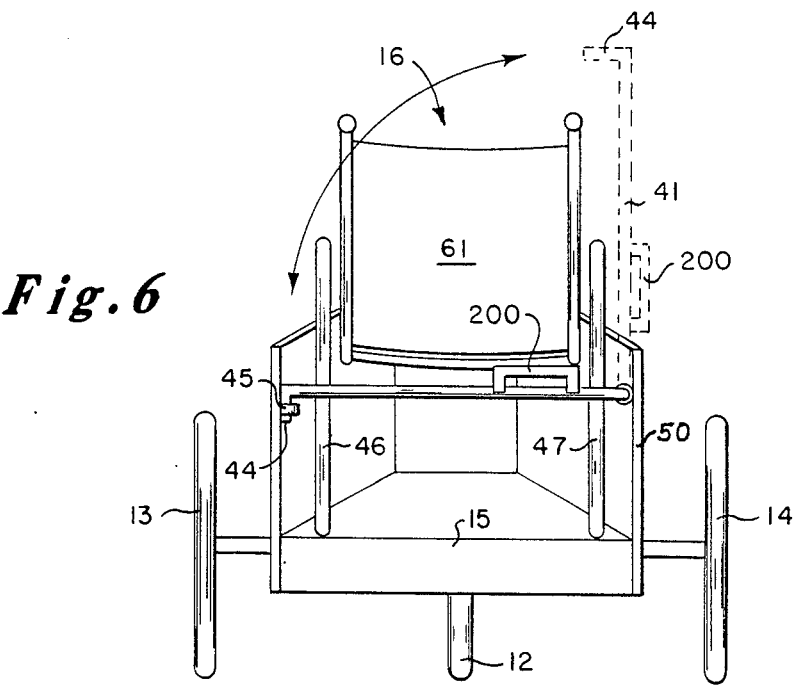
FIGS. 6 and 7 are diagrammatic rear and top views, respectively, of a means for keeping the wheelchair locked in position on the platform.
Figure 7:
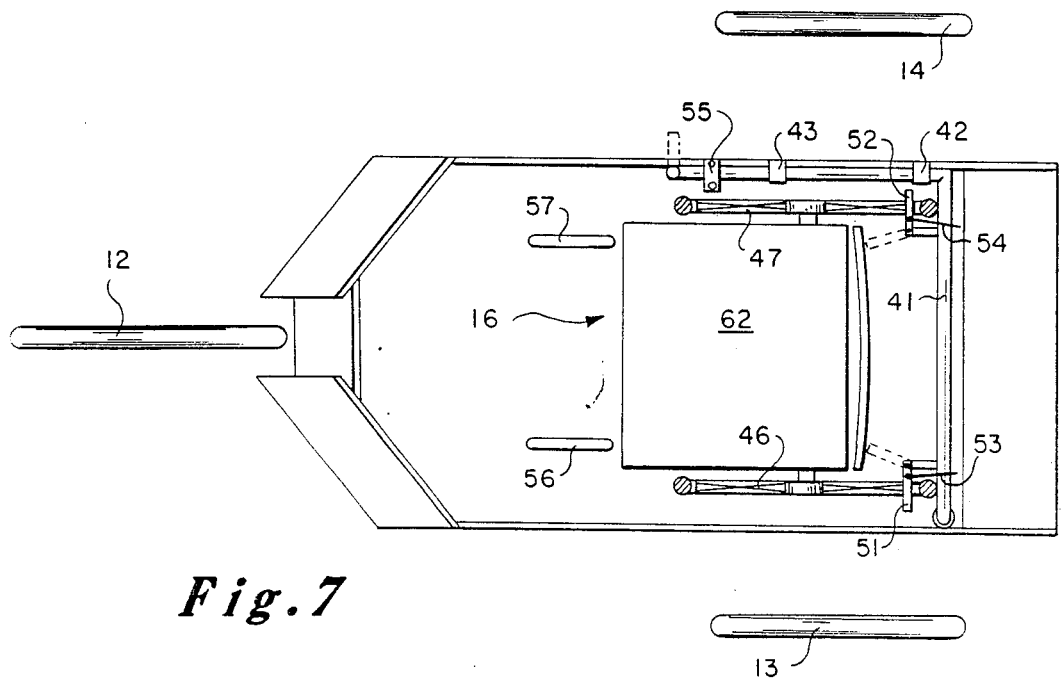

Referring to FIGS. 6 and 7, there are shown diagrammatic rear and top views, respectively, of a means for keeping the wheelchair locked in position on platform 15. Locking bar 41 has rear and side mutually perpendicular portions with the side portion pivotally attached to the right side 50 above platform 15 through rear and front bearings 42 and 43, respectively, best seen in FIG. 7. With wheelchair 16 positioned as shown, locking bar 41 may be rotated about the axis of the leg passing through bearings 42 and 43 with its stud 44 seated in socket 45 and its rear portion engaging rear wheels 46 and 47 of wheelchair 16. Locking bar 41 carries left and right locks 51 and 52, respectively, which are controlled by flexible cables 53 and 54 operated by lock control 55. Pushing lock control 55 forward moves locks 51 and 52 from the position indicated by dotted outline through the spokes in rear wheels 46 and 47, respectively, into firm engagement with the inside of each wheel rim to keep wheelchair 16 firmly in place with front wheels 56 and 57 positioned as shown and wheelchair back 61 and wheelchair seat 62 positioned as shown in FIGS. 6 and 7, respectively. The entire assembly of bar, catch and locks prevents sideways motion of the wheelchair because in order to move the front sideways (which is normally an easy motion for a wheelchair), one rear wheel must move forward or backward, and the assembly of FIGS. 6 and 7 prevent this.

Figure 8:
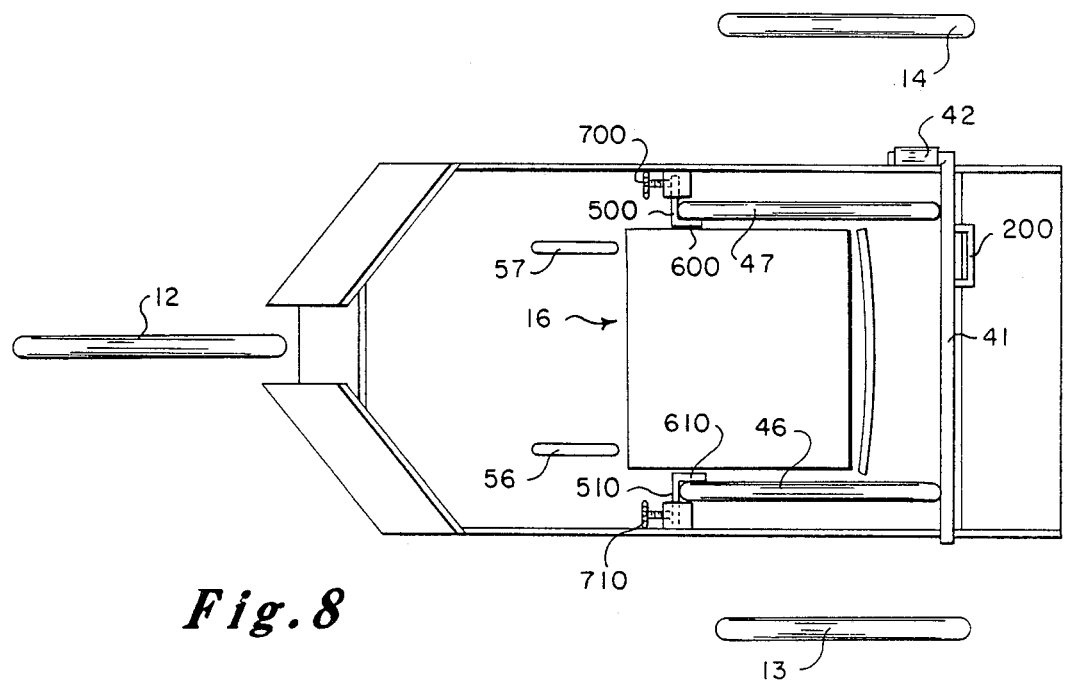
FIG. 8 is a diagrammatic top view of a preferred means for locking the wheelchair upon the platform.

Referring to FIG. 8, there is shown a diagrammatic top view of a preferred form of locking means comprising a locking bar 41 which can pivot between a vertical unlocked position and a horizontal locked position. In the horizontal locked position the locking bar 41 is in contact with the rearmost part of the rear wheelchair wheels 46 and 47. Locking bar 41 therefore prevents the wheelchair from moving toward the rear of the vehicle when in the locked (horizontal) position.

Locking bar 41 includes a handle 200 for allowing the rider to move bar 41 between the vertical and horizontal positions while seated in the wheelchair.

Two front wheelchair stops 500 and 510 engage the front of left and right wheels 47 and 46, respectively. When the wheelchair is positioned on the platform such that the front of the rear wheelchair wheels 47 and 46 touch the front wheelchair stops 500 and 510, respectively, and the rear locking bar 41 is in the horizontal position, the wheelchair is prevented from moving either forwards or rearwards on the platform. To prevent sidewards movement, the front wheelchair stops 500 and 510 are made with side stops 600 and 610, respectively, which project from the front stops toward the rear of the vehicle and engage the sides of the rear wheels 46 and 47. The widths of the side stops is adjustable by screws 700 and 710 to accommodate different width wheelchairs.

Figure 9:
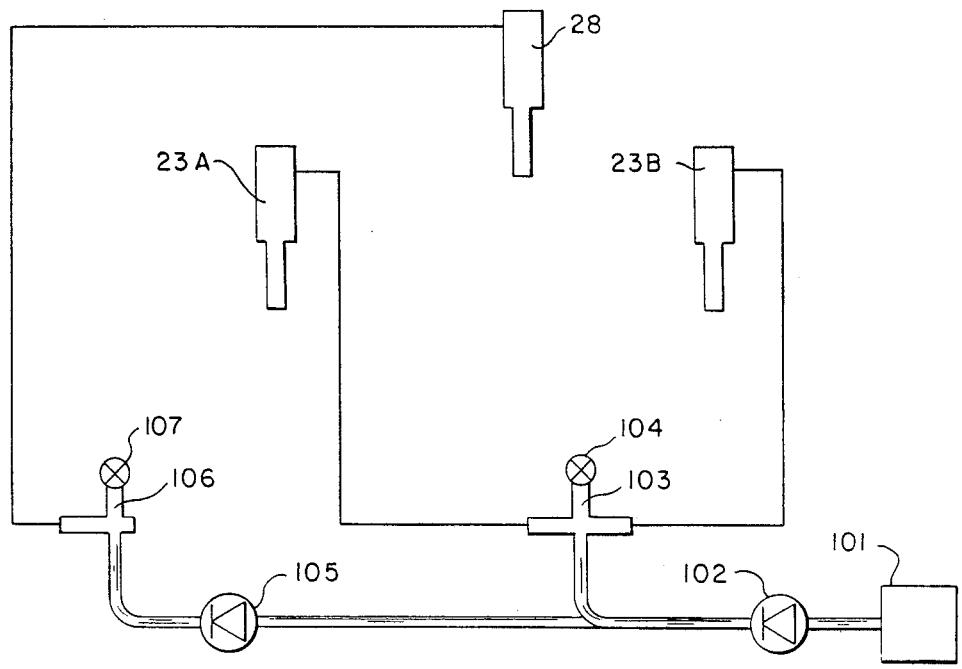
FIG. 9 is a diagrammatic representation of a preferred form of pneumatic system for raising and lowering.

A preferred means of the actuator is pneumatic. When pneumatic actuators are used they may also function as components in an air suspension system allowing movement between the upper limit of travel and the safety stop. The three actuators in the preferred pneumatic actuator system are operated by the air circuit shown in FIG. 9. Compressor 101 pumps air through check valve 102 into tee 103. This allows filling rear actuators 23A and 23B simultaneously while check valve 102 prevents air from being released back through the compressor after is is shut off. Air is also pumped through check valve 105 into fitting 106 which permits filling front actuator 28. Drain valve 104 is used to release air from the rear actuators. Check valve 105 prevents the front actuator from draining when drain valve 104 is open. In this way the rear of the vehicle can be lowered without affecting the front, which is a preferred method of lowering onto a curb or sidewalk. Drain valve 107 is used to drain all air from the system to lower the vehicle front and rear to the ground. A preferred type of drain valve is a push button valve which is operated by a cam such that the first 30° of cam rotation opens drain valve 104 only and the next 30° of cam rotation opens drain valves 104 and 107 together. This permits simple control of the air system using only one control lever (lever 60 FIG. 3).

Figure 10:
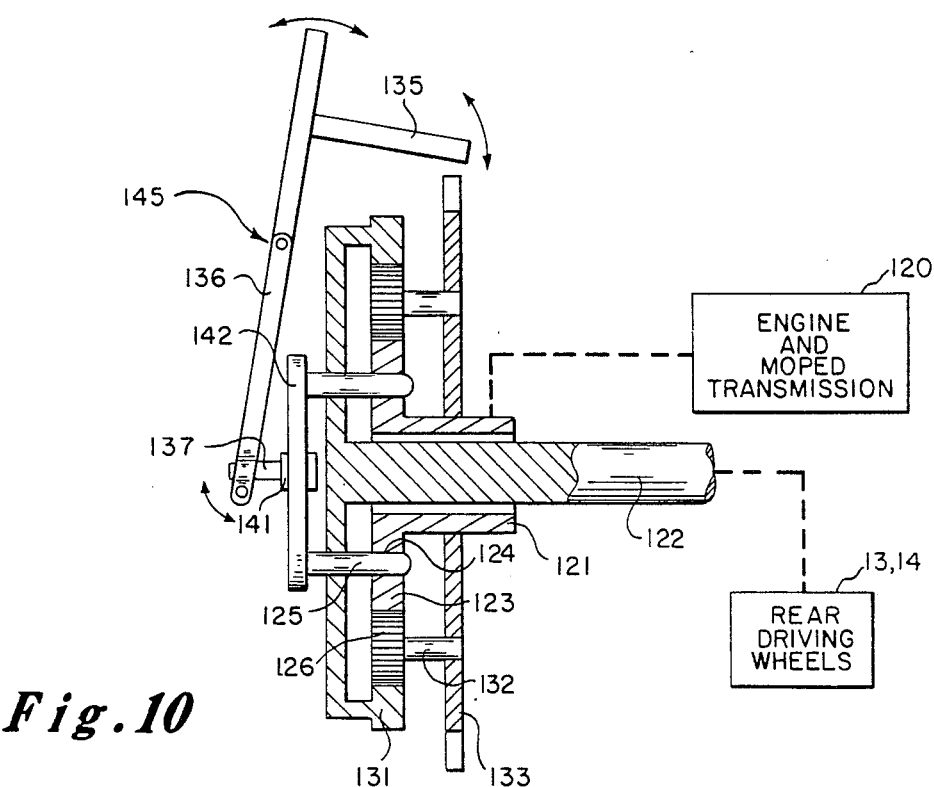
FIGS. 10 and 11 are partial elevation and plan sectional views, respectively, of a preferred form of mechanical transmission for effecting reversal.
Figure 11:
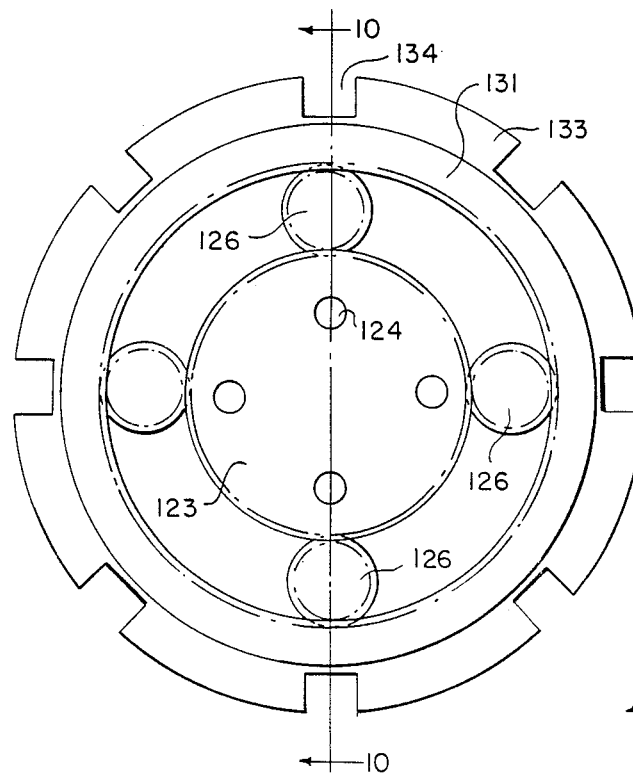

Referring to FIGS. 10 and 11, there are shown partial axial elevation and plan views, respectively, of a preferred form of arrangement for selectively providing reversal with a planetary gear transmission. A hollow power input shaft 121 receives power from a conventional moped transmission (120) and coaxially surrounds power output shaft 122 that is connected to one or both of rear wheels 13 and 14 in a known manner, such as through a differential, if both wheels receive driving power. Power input shaft 121 is connected to sun gear 123 formed with openings such as 124 for accommodating forward gear lock pins such as 125. Sun gear 123 meshes with planet gears 126 which ride in ring gear 131 and are supported on shafts such as 132 carried by planet gear carrier 133 formed with reverse engage notches such as 134. A reverse lock 135 is connected to a shift lever 136 pivotally connected to an axial link 137 that rides in a shift linkage bearing 141 in forward gear lock pin support 142. Shift lever 136 pivots at pivot 145.

Having briefly described the structure of the planetary gear transmission for selectively effecting reversal, its mode of operation will be described. When in forward gear as shown with reverse lock 135 raised and locking pins 125 seated in openings 124, power output shaft 122 receives power from power input shaft 121 through sun gear 123 locked to ring gear 131 to which power output shaft 122 is directly connected. When in forward gear with locking pins 125 seated in openings 124, sun gear 123, planet gear carrier 133 and ring gear 131 all rotate together.

In reverse, reverse lock 135 is pushed down by shift lever 136 pivoting at 145 to engage a notch 134 in planet gear carrier 133 and displace forward gear lock pin holder 142 to the left to disengage lock pins 125 from openings 124 so that sun gear 123 is no longer locked into step with ring gear 131. Planet gear carrier 133 then remains stationary so that the rotation of sun gear 123 is transmitted through planet gears 126 through ring gear 131 to cause ring gear 131 to rotate in the opposite direction from sun gear 123 and power input shaft 121 attached thereto and thereby cause power output shaft 122 to rotate in the opposite or reverse direction.

The invention has a number of features and advantages. A person confined to a wheelchair can embark, disembark and ride easily without the assistance of others. Consider the following typical situation with the invention positioned with ramp 27 providing access from the ground or a sidewalk. The wheelchair operator rolls the wheelchair up ramp 27 into position on platform 15. The operator guides the front of the rear wheels into the front wheelchair stops. The operator rotates locking bar 41 into the locked position. The operator may then start the engine to obtain power for operating the actuators should the actuators be pneumatic or electric or powered hydraulic where power from the engine would be useful. For mechanical actuators, the operator may operate the actuators before or after starting the engine. The operator causes the actuators to extend and lift platform 15 into the riding position shown in FIG. 3. The front and rear safety locking mechanisms then engage automatically. With the engine started, the operator guides the invention to the desired destination in essentially the same manner as operating a moped.

At the desired destination, the process just described is reversed. The operator unlocks locking mechanism 33 and retracts safety stop 35. The operator retracts actuators 28 and 23A and 23B until ramp 27 contacts the ground. The operator then rotates locking bar 41 about the axis passing through bearing 42 until the rear arm is vertical. The operator then backs off platform 15 over ramp 27.

When disembarking over a curb upon a sidewalk, it is advantageous to back the invention slowly toward the curb until rear wheels 13 and 14 engage the curb. To this end transmission 32 includes a special planetary gear reversing mechanism.

There has been described novel apparatus and techniques for wheelchair transporting that enables a person confined to a wheelchair to easily board, leave and operate a relatively inexpensive means of powered transportation over the public ways. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the patent claims or any reissue thereof.

What is claimed is:

1. Wheelchair carrying apparatus operable for entry and exit by the wheelchair operator without assistance and for transport with the wheelchair operator seated in the wheelchair and being transported thereby, comprising, platform means having a front and rear for supporting a wheelchair with the operator therein, first and second rear wheel means to the side of and separated by said platform means for rollably supporting said platform means, platform support means for supporting said platform means and said rear wheel means while allowing relative vertical displacement between said rear wheel means and said platform means between a riding position with said platform means substantially horizontal a first predetermined height above a surface supporting said rear wheel means and an access position substantially horizontal a second predetermined height above said surface less than said first predetermined height, steerable front wheel means for rollably supporting said platform means for movement along a steered direction, steering control means coupled to said front wheel means accessible to a wheelchair operator seated in a wheelchair when on said platform means for controlling steering direction, and actuating means intercoupling said platform means and said platform support means for selectively raising said lowering said platform means and thereby selectively positioning said platform means in said riding and access positions.

2. Wheelchair carrying apparatus in accordance with claim 1 wherein said platform support means comprises U-shaped axle means having the bight thereof forward of said rear wheel means and below said platform means and said first and second rear wheel means comprise left and right rear wheels respectively supported on left and right legs of said U-shaped axle means respectively, and said front wheel means comprises a single wheel steerable in a plane substantially midway between said left and right rear wheels.

3. Wheelchair carrying apparatus in accordance with claim 2 wherein said front wheel has a front wheel axle which is connected to said steering control means by a front wheel linkage having a top pivotal connection at the top of said linkage and the front wheel axle is at the bottom of said linkage and said actuating means further comprises, front actuating means interconnecting the front wheel linkage and said platform means for selectively moving the front wheel linkage about the top pivotal connection to aid in moving said platform means between said riding and access positions.

4. Wheelchair carrying apparatus in accordance with claim 1 and further comprising, wheelchair clamping means for securing a wheelchair to said platform means to prevent lengthwise and sidewards movement of the wheelchair on said platform means.

5. Wheelchair carrying apparatus in accordance with claim 4 wherein said wheelchair clamping means comprises, rear locking bar means pivotal from a generally vertical unlocked position to a generally horizontal locked position for engagement with the wheelchair rear wheels for preventing rearward motion of the wheelchair when on said platform means, front wheelchair stop means for engagement with the front of the rear wheelchair wheels for preventing movement of the wheelchair forward when on said platform means, and side stop means for engagement with the sides of the rear wheelchair wheels for preventing sidewards movement of the wheelchair when on the platform means.

6. Wheelchair carrying apparatus in accordance with claim 1 wherein said actuating means comprises front actuating means for selectively raising and lowering the front of said platform means and rear actuating means for selectively raising and lowering the rear of said platform means, and means for selectively operating said rear actuating means independently of said front actuating means for lowering the rear of said platform means to a level that is above the level on which said rear wheel means rest.

7. Wheelchair carrying apparatus in accordance with claim 1 and further comprising safety locking means for selectively preventing said platform means from descending below a predetermined level above the level upon which said wheel means rest when said platform means is in said riding position.

8. Wheelchair carrying apparatus in accordance with claim 1 wherein said platform support means comprises frame means surrounding said platform means for interconnecting said rear wheel means and said steerable front wheel means, and pivot means interconnecting said platform means and said frame means for allowing said platform means to be raised and lowered within said frame means.

9. Wheelchair carrying apparatus in accordance with claim 8 wherein said actuating means includes means for selectively positioning said platform means to different heights while said platform means remains substantially horizontal.

10. Wheelchair carrying apparatus in accordance with claim 8 wherein said platform means is formed with ramp means at the rear thereof sloping downward for contacting an outside wheelchair supporting surface for enabling a wheelchair to easily roll between said platform means and the latter surface over said ramp means under manual control of a wheelchair operator.

11. Wheelchair carrying apparatus in accordance with claim 10 wherein said ramp means extends beyond the rear wheel means so that the ramp means may contact a curb or sidewalk while said apparatus is in a street to allow wheelchair access to said sidewalk or curb.

12. Wheelchair carrying apparatus in accordance with claim 1 wherein said actuator means comprises pneumatic actuating means that also comprise an air suspension when said apparatus is in said riding position.

13. Wheelchair carrying apparatus in accordance with claim 1 and further comprising, safety locking means for normally preventing said platform means from descending to said access position, and means for manually releasing said safety locking means to allow said platform means to descend to said access position.

14. Wheelchair carrying apparatus operable for entry and exit by the wheelchair operator without assistance and for transport with the wheelchair operator seated in the wheelchair and being transported thereby, comprising, platform means for supporting a wheelchair with the operator therein, rear wheel means to the side of said platform means for rollably supporting said platform means, platform support means for supporting said platform means and said rear wheel means while allowing relative vertical displacement between said rear wheel means and said platform means between a riding position with said platform means a first predetermined height above a surface supporting said rear wheel means and an access position a second predetermined height above said surface less than said first predetermined height, steerable front wheel means for rollably supporting said platform means for movement along a steered direction, steering control means coupled to said front wheel means accessible to a wheelchair operator seated in a wheelchair when on said platform means for controlling steering direction, and actuating means intercoupling said platform means and said platform support means for selectively raising and lowering said platform means and thereby selectively positioning said platform means in said riding and access positions, wherein said platform means is formed with slightly sloped ramp means at the end extending slightly rearward of said rear wheel means for contacting an outside wheelchair-supporting surface for enabling a wheelchair to easily roll between said platform means and the latter surface over said ramp means under the manual control of a wheelchair operator.

15. Wheelchair carrying apparatus operable for entry and exit by the wheelchair operator without assistance and for transport with the wheelchair operator seated in the wheelchair and being transported thereby comprising, platform means for supporting a wheelchair with the operator therein, rear wheel means to the side of said platform means for rollably supporting said platform means, platform support means for supporting said platform means and said rear wheel means while allowing relative vertical displacement between said rear wheel means and said platform means between a riding position with said platform means a first predetermined height above a surface supporting said rear wheel means and an access position a second predetermined height above said surface less than said first predetermined height, steerable front wheel means for rollably supporting said platform means for movement along a steered direction, steering control means coupled to said front wheel means accessible to a wheelchair operator seated in a wheelchair when on said platform means for controlling steering direction, actuating means intercoupling said platform means and said platform support means for selectively raising and lowering said platform means and thereby selectively positioning said platform means in said riding and access position, engine and transmission means for providing motive power to said rear wheel means, and reversing transmission means intercoupling said engine and transmission means to said rear wheel means for selectively enabling both forward and reverse power movement of said apparatus.

16. Wheelchair carrying apparatus in accordance with claim 15 wherein said reversing transmission means comprises, a planetary gear transmission having a sun gear, a ring gear surrounding said sun gear and planet gears meshing with an intermediate said sun and ring gears, means for selectively disabling transmission of power through relative movement of said sun, planetary and ring gears for forward operation and for transmitting power through relative movement between said sun, planetary and ring gears in reverse operation.

17. Wheelchair carrying apparatus in accordance with claim 12 wherein said means for selectively enabling forward and reverse operation comprises, means for driving said sun gear with engine power, means for driving said rear wheel means with output power provided by said ring gear, and means for selectively preventing rotation of said planetary gears about said sun gear to transmit driving power therethrough from said sun gear to said ring gear to cause said ring gear to rotate in a direction opposite to the rotation of said sun gear, and means for selectively producing forward operation by locking said ring and sun gears together while allowing said planetary gears to rotate about the axis of said sun gear.

18. Wheelchair carrying apparatus operable for entry and exit by the wheelchair operator without assistance and for transport with the wheelchair operator seated in the wheelchair and being transported thereby, comprising, platform means for supporting a wheelchair with the operator therein, rear wheel means to the side of said platform means for rollably supporting said platform means, platform support means for supporting said platform means and said rear wheel means while allowing relative vertical displacement between said rear wheel means and said platform means between a riding position with said platform means a first predetermined height above a surface supporting said rear wheel means and an access position a second predetermined height above said surface less than said first predetermined height, steerable front wheel means for rollably supporting said platform means for movement along a steered direction, steering control means coupled to said front wheel means accessible to a wheelchair operator seated in a wheelchair when on said platform means for controlling steering direction, actuating means intercoupling said platform means and said platform support means for selectively raising and lowering said platform means and thereby selectively positioning said platform means in said riding and access positions, wherein said actuator means comprises pneumatic actuating means that also comprise an air suspension when said apparatus is in said riding position.

* * * * *